US008988445B2

(12) United States Patent
Kuchenbecker et al.

(10) Patent No.: US 8,988,445 B2
(45) Date of Patent: Mar. 24, 2015

(54) SYSTEMS AND METHODS FOR CAPTURING AND RECREATING THE FEEL OF SURFACES

(75) Inventors: Katherine J. Kuchenbecker, Philadelphia, PA (US); Joseph Romano, Philadelphia, PA (US); William McMahan, Philadelphia, PA (US); Nils Landin, Stockholm (SE)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 296 days.

(21) Appl. No.: 13/193,731

(22) Filed: Jul. 29, 2011

(65) Prior Publication Data

US 2012/0026180 A1    Feb. 2, 2012

Related U.S. Application Data

(60) Provisional application No. 61/369,254, filed on Jul. 30, 2010.

(51) Int. Cl.
| | | |
|---|---|---|
| G09F 5/00 | (2006.01) | |
| G09G 5/08 | (2006.01) | |
| G06F 3/02 | (2006.01) | |
| G06F 3/01 | (2006.01) | |
| G06F 3/0346 | (2013.01) | |
| G06F 3/0354 | (2013.01) | |

(52) U.S. Cl.
CPC ............ *G06F 3/016* (2013.01); *G06F 3/0346* (2013.01); *G06F 3/03545* (2013.01); *G06F 3/0354* (2013.01)
USPC ........... 345/582; 345/163; 345/156; 345/157; 345/158; 715/701; 715/700; 715/702; 715/850

(58) Field of Classification Search
None
See application file for complete search history.

(56) References Cited

U.S. PATENT DOCUMENTS

| | | | |
|---|---|---|---|
| 4,655,673 A | 4/1987 | Hawkes | |
| 6,232,891 B1 * | 5/2001 | Rosenberg | ...................... 341/20 |
| 7,864,173 B2 * | 1/2011 | Handley et al. | ............... 345/420 |
| 7,963,770 B2 | 6/2011 | Kukora et al. | |
| 7,997,126 B2 * | 8/2011 | Kang et al. | ...................... 73/105 |
| 8,016,818 B2 | 9/2011 | Ellis et al. | |
| 8,190,292 B2 * | 5/2012 | Niemeyer et al. | ............. 700/245 |
| 2004/0233167 A1 * | 11/2004 | Braun et al. | ................... 345/163 |

(Continued)

OTHER PUBLICATIONS

Kuchenbecker, Katherine J., "Haptography: Capturing the Feel of Real Objects to Enable Authentic Haptic Rendering (Invited Paper)", HAS '08 (Feb. 11-14, 2008), 3 pgs.

(Continued)

*Primary Examiner* — Kimbinh T Nguyen
*Assistant Examiner* — Raffi Isanians
(74) *Attorney, Agent, or Firm* — RatnerPrestia

(57) ABSTRACT

Systems and methods for capturing and recreating the feel of a surface are disclosed. A method for capturing a feel of a surface comprises contacting the surface with a handheld tool, recording data measured by the tool, and generating a texture model of the surface based on the recorded data. A method for recreating a feel of a surface comprises contacting a virtual surface with a handheld tool, determining an estimated contact force based on the data measured by the tool, generating a vibration waveform from a texture model based on the data measured by the tool; and actuating at least one actuator of the tool according to the vibration waveform. A system for capturing and recreating a feel of a surface comprises a handheld tool, a storage device, and a processor.

10 Claims, 12 Drawing Sheets

(56) References Cited

U.S. PATENT DOCUMENTS

| | | | |
|---|---|---|---|
| 2006/0005613 A1* | 1/2006 | Kuwajima et al. | 73/104 |
| 2006/0279537 A1* | 12/2006 | Kim et al. | 345/156 |
| 2007/0001638 A1 | 1/2007 | Gray et al. | |
| 2008/0012826 A1* | 1/2008 | Cunningham et al. | 345/156 |
| 2009/0012532 A1 | 1/2009 | Quaid et al. | |
| 2009/0163929 A1 | 6/2009 | Yeung et al. | |
| 2010/0013653 A1* | 1/2010 | Birnbaum et al. | 340/669 |
| 2010/0261526 A1* | 10/2010 | Anderson et al. | 463/31 |
| 2011/0285637 A1* | 11/2011 | Karkkainen | 345/173 |
| 2012/0310257 A1 | 12/2012 | Kuchenbecker et al. | |

OTHER PUBLICATIONS

Landin, Nils, "Dimensional Reduction of High-Frequency Accelerations for Haptic Rendering", EuroHaptics, Part II, LNCS 6192 (2010), 79-86.

McMahan, William, "Haptic Display of Realistic Tool Contact Via Dynamically Compensated Control of a Dedicated Actuator", IEEE/RSJ International Conference on Intelligent Robots and Systems (Oct. 11-15, 2009), 3170-3177.

Okamura, A. M., "Measurement-Based Modeling for Haptic Rendering", Haptic Rendering (Jul. 2008), 445-469.

Romano, Joseph M., "Automatic Filter Design for Synthesis of Haptic Textures from Recorded Acceleration Data", IEEE International Conference on Robotics and Automation, (May 3-7, 2010), 1815-1821.

D. Kontarinis, et al., "Tactile Display of Vibratory Information in Teleoperation and Virtual Environments", 4(4):387-402, 1995.

D. Kontarinis, et al., "A Multiparameter Tactile Display System for Teleoperation", pp. 103-108, 1995.

International Search Report and Written Opinion dated Apr. 6, 2011, application No. PCT/US11/23995.

"A Tactile Magnification Instrument for Minimally Invasive Surgery", Hsin-Yun Yao et al., 2004, LNCS 3217, pp. 89-96.

"Vibrotactile Feedback for Industrial Telemanipulators", Jack Dennerlein et al, ASME IMECE, Dallas, Nov. 15-21, 1997, pp. 1-7.

"Touch Magnifying Instrument Applied to Minimally Invasive Surgery", Hsin-Yun Yao, Department of Electrical & Computer Engineering, Sep. 2004, pp. 1-55.

International Search Report dated Jun. 20, 2014, application No. PCT/US2014/021145.

* cited by examiner

SYSTEMS AND METHODS FOR CAPTURING AND RECREATING THE FEEL OF SURFACES

CROSS REFERENCE TO RELATED APPLICATIONS

This application claims priority to U.S. Patent Application No. 61/369,254, entitled "SYSTEMS AND METHODS FOR CAPTURING AND RECREATING THE FEEL OF SURFACES," filed on Jul. 30, 2010, the contents of which are incorporated herein by reference in their entirety.

FIELD OF THE INVENTION

The present invention relates generally to haptic human-computer interfaces, which enable a user to interact with virtual objects through motions and forces. More particularly, the invention relates to "haptography" (or "haptic photography"), which involves using a human-computer interface to capture and recreate the feel of real surfaces.

BACKGROUND OF THE INVENTION

The ability to touch the surface of an object allows one to feel and determine a number of structural characteristics about the object, such as its shape, stiffness, friction, texture, or other characteristics. Humans are adept at eliciting and interpreting these feelings, called haptic feedback, during physical interaction with an object.

Haptic interfaces seek to extend the normal reach of the human hand to enable interaction with virtual objects, either by direct touch or through tool-mediated contact. Haptic interfaces measure the motion of the human hand and map it into a virtual environment. For example, a control computer may be programmed to determine when and how a user is touching objects in the virtual environment. When contact occurs, the system may employ actuators to provide the user with haptic feedback about the virtual object.

However, current haptic interfaces require extensive tuning or adjustment, and do not feel authentic, which limits the usefulness and applicability of such systems. Accordingly, improved systems and methods are desired for capturing and recreating the feel of surfaces.

SUMMARY OF THE INVENTION

Aspects of the present invention are related to systems and methods for capturing and recreating the feel of surfaces.

In accordance with one aspect of the present invention, a method for capturing a feel of a surface is disclosed. The method comprises the steps of contacting the surface with a handheld tool; recording the acceleration experienced by the tool, the force experienced by the tool, and the speed of the tool while the tool contacts the surface; and generating a texture model of the surface based on the recorded acceleration, force, and speed. The handheld tool includes at least one accelerometer configured to measure an acceleration experienced by the tool, at least one force sensor configured to measure a force experienced by the tool, and at least one speed sensor configured to measure a speed of the tool.

In accordance with another aspect of the present invention, a method for recreating a feel of a surface is disclosed. The method comprises the steps of contacting a virtual surface with a handheld tool; determining an estimated contact force based on the measured force experienced by the tool and an estimated contact speed based on the measured speed of the tool; generating a vibration waveform from a texture model based on the estimated contact speed and the estimated contact speed of the tool; and actuating at least one actuator of the tool according to the vibration waveform. The handheld tool includes at least one actuator configured to provide an acceleration to the tool, at least one force sensor configured to measure a force experienced by the tool, and at least one speed sensor configured to measure a speed of the tool.

In accordance with still another aspect of the present invention, a system for capturing and recreating a feel of a surface is disclosed. The system comprises a handheld tool, a storage device, and a processor. The handheld tool includes at least one accelerometer configured to measure an acceleration experienced by the tool, at least one force sensor configured to measure a force experienced by the tool, and at least one speed sensor configured to measure a speed of the tool. The storage device is in communication with the tool. The storage device is operable to store the acceleration experienced by the tool, the force experienced by the tool, and the speed of the tool over a period of time. The processor is in communication with the storage device. The processor is programmed to generate a texture model of the surface based on the acceleration, force, and speed stored in the storage device.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF THE INVENTION

Figure 1A:
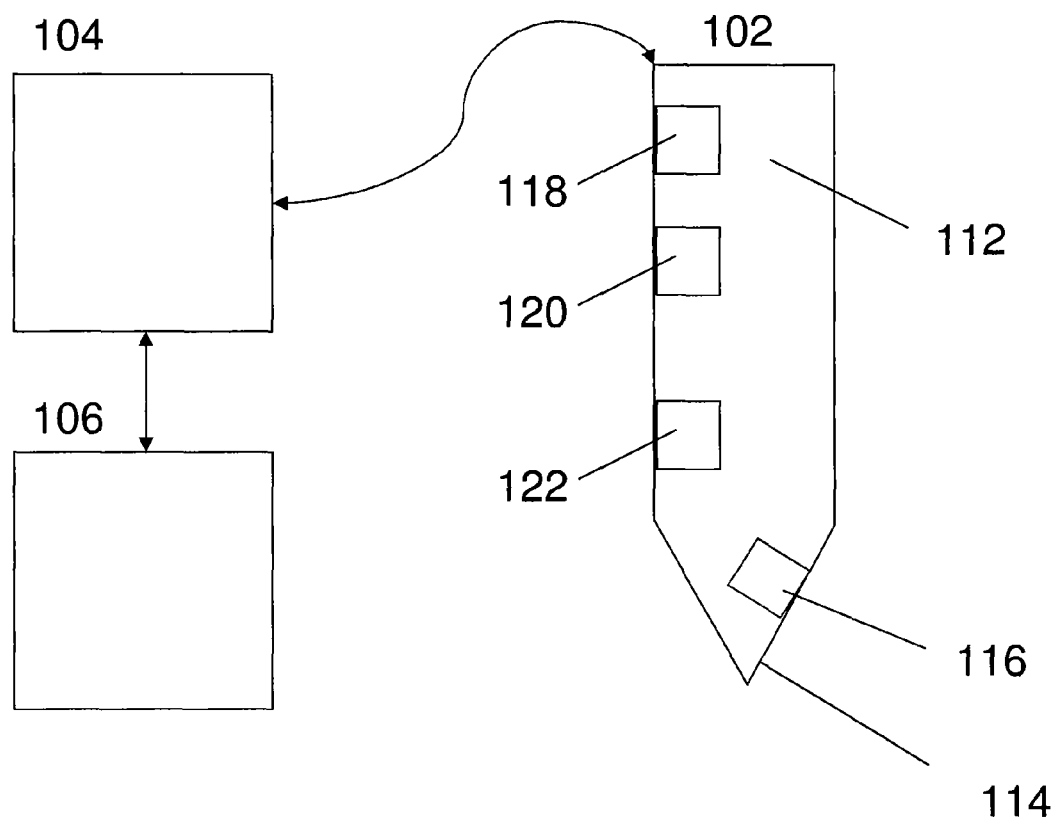
FIG. 1A is a block diagram depicting an exemplary system for capturing and recreating the feel of the surface of an object in accordance with an aspect of the present invention.

The exemplary systems and methods disclosed herein are suitable for providing a haptic interface for a user. For example, the disclosed systems and methods may capture the haptic feedback from contact with a real surface. The disclosed systems and methods may then reproduce haptic feedback to simulate virtual contact with the real surface. As set forth in further detail below, the exemplary systems and methods capture and recreate haptic feedback by mathematically characterizing the vibrational feel of real and virtual surfaces. They further employ computer-generated vibrations to duplicate the feel of a real surface.

The exemplary systems and methods are described herein as relating to the capture and recreation of the "feel" of surfaces. One factor that contributes to the feel of a surface is the roughness and/or texture of the surface. The disclosed systems and methods are particularly suitable for capturing and recreating a surface's roughness or texture.

While aspects of the present invention are related to capturing and recreating all forms of haptic interaction, the systems and methods described herein may be particularly suitable for providing haptic interfaces that rely on "tool-mediated contact," i.e., where a human touches a surface through an intermediate object or tool such as a plastic stylus, metal implement, or paintbrush. It has been determined that humans are surprisingly good at discerning haptic surface properties such as stiffness and texture through an intermediate tool; this acuity may stem in part from the human capability for distal attribution, in which a hand-held tool comes to feel like an extension of one's own body because its dynamics are simple to understand. As such, employing the disclosed systems and methods disclosed herein may be useful for simulating many activities of interest that are commonly conducted with an implement in hand, rather than with the bare fingertip or hand.

The exemplary systems and methods disclosed herein may also be used to perform haptography. Like photography is for visual sensations, haptography may enable an individual to 1) quickly and easily record all aspects of the haptic interaction between a tool tip and a real surface and 2) accurately reproduce it later for others to interactively experience in a wide variety of useful contexts.

For example, a haptographer may begin by identifying an object with a unique feel: a museum curator might select an interesting archaeological artifact, an engineer could pick a beautifully manufactured mechanical component, or a doctor might target an in vivo sample of tissue, tooth, or bone. Working in his or her standard surroundings, the haptographer may choose a suitable tool tip and attach it to a highly sensorized hand-held instrument. He or she then uses this combined tool to explore the object's surface via natural motions, which may include segments of tapping, stroking, and pressing, as well as repositioning movements in free space. A haptographic processor may collect multiple data streams throughout this brief interaction, including quantities such as the translation and rotation of the stylus and the object, the forces and torques applied to the object's surface, and the three-dimensional high-frequency accelerations of the tool tip. Tip acceleration may be particularly important because tool-mediated interaction with hard and textured surfaces can create vibrations that are particularly useful for recreating a realistic textural feel.

The haptographic processor may use the recorded data to construct a faithful geometric and haptic model of the object. This characterization process may take place in real time so that the state of the derived model could be conveyed to the haptographer instantaneously, just as the preview screen on a digital camera helps a photographer decide how to adjust the lighting and framing of the visual scene being captured. An acquired haptographic model (a "haptograph") may desirably be renderable at a remote haptic interface. Rendering of the haptograph may be performed in real time or at a later time determined by a user. The systems and methods described herein provide new high-fidelity methods for creating and rendering haptographs.

Referring now to the drawings, FIGS. 1A-2B illustrate an exemplary system 100 for capturing and recreating the feel of the surface of an object in accordance with an aspect of the present invention. As an overview, system 100 includes a handheld tool 102, a storage device 104, and a processor 106. Additional details of system 100 are described below.

Tool 102 is used by the user to touch the surface to be captured, or to recreate the surface to be recreated. Tool 102 is a handheld implement that can be grasped and manipulated by the user. Tool 102 may include a handle portion 112 for grasping by the user, and one or more tip portions 114 for contacting the surface to be captured. Tip portions 114 may be constructed in a wide variety of shapes and materials, and they may be interchangeable. In an exemplary embodiment, tool 102 may be shaped like a stylus or wand, as shown in FIGS. 1B, 1C, and 2A-2B.

Tool 102 may be used for capturing a surface, for recreating a captured surface, or for both purposes. The following components of tool 102 may be selected based on the desired use of tool 102. Additionally, system 100 may include one tool 102 for capturing a surface and a separate tool 102 for recreating a surface.

Where tool 102 is used for contacting the surface to be captured, tool 102 includes at least one accelerometer 116. Accelerometer 116 may be integrally built into tool 102, or may be attached to tool 102. Accelerometer 116 is coupled to tool 102 in a location where accelerometer 116 can measure an acceleration experienced by tool 102. In an exemplary embodiment, accelerometer 116 may preferably be coupled to the tip portion 114 of tool 102, as shown in FIG. 1A, in order to improve sensing of the vibrations of tool 102 caused by the surface. While one accelerometer 116 is illustrated, it will be understood that tool 102 may include any number of accelerometers 116.

Accelerometer 116 may desirably have multiple (e.g., three) orthogonal measurement axes for measuring the acceleration of tool 102 in multiple dimensions; however, it is not necessary that accelerometer 116 be a multiple-axis accelerometer.

Accelerometer 116 may desirably measure only vibrations occurring within a predetermined range of frequencies (i.e. within a passband). In an exemplary embodiment, accelerometer 116 has a bandwidth from approximately 20 Hz to approximately 200 Hz, and more preferably, a bandwidth from 20 Hz to approximately 1000 Hz or higher. Thus, accelerometer 116 may only measure vibrations having a frequency up to approximately 200 Hz, or more preferably, up to 1000 Hz or higher. System 100 may optionally be reconfigurable so that a user can change the bandwidth of the vibrations measured to suit the user's preference. For example, the passband could be adjusted to start below or above the above-identified frequencies, and optionally remove selected frequency ranges. It may be desirable to restrict the accelerations measured above 1000 Hz, as this frequency range approximately corresponds to the bandwidth of the human sense of touch.

Suitable accelerometers for use as accelerometer 116 include, for example, MEMS-based high-bandwidth accelerometers, capacitive accelerometers, piezoelectric or piezoresistive accelerometers, Hall effect accelerometers, magnetoresistive accelerometers, heat transfer accelerometers, or other suitable accelerometers. Suitable accelerometers for use as accelerometer 116 will be known to one of ordinary skill in the art from the description herein.

Where tool 102 is used for recreating the surface, tool 102 includes at least one actuator 118. Actuator 118 may be integrally built into tool 102, or may be attached to tool 102. Actuator 118 is coupled to tool 102 in a location where actuator 118 can provide an acceleration to tool 102. In an exemplary embodiment, actuator 118 is coupled to the handle portion 112 of tool 102, as shown in FIG. 1A, in order to provide a vibration that can be felt by the tool's holder. Actuator 118 may preferably be coupled to the tip portion 114 of tool 102 so that the vibrations it creates emanate from a location close to the point of contact between the tool's tip portion 114 and a real or virtual surface. Actuator 118 may also preferably consist of two parts coupled together via a spring; one part may be coupled to tool 102 directly, and the other part may vibrate while staying centered due to the spring. While one actuator 118 is illustrated, it will be understood that tool 102 may include any number of actuators 118.

Actuator 118 provides vibrations to tool 102 that correspond in frequency of the vibrations measured by accelerometer 116. Actuator 118 may desirably only provide vibrations occurring within a predetermined range of frequencies (i.e. within the passband), as described with respect to accelerometer 116. Actuator 118 may optionally be reconfigurable so that a user can change the bandwidth of the vibrations created to suit the user's preference. For example, the passband could be adjusted to start below or above the above-identified frequencies, and optionally remove selected frequency ranges. It may be desirable to restrict the vibrations created above 1000 Hz, as this frequency range approximately corresponds to the bandwidth of the human sense of touch.

Actuator 118 must be powerful enough to create tool vibrations that the user can detect. Preferably, actuator 118 should provide vibrations to the user that correspond in amplitude to the vibrations felt by tool 102. It is preferable that actuator 118 be operable to provide vibration output that can have independently varying frequencies and amplitude. In an exemplary embodiment, actuator 118 is a linear voice coil actuator. The linear voice coil actuator includes a coil of wire configured to function as an electromagnet, and a permanent magnet. These two elements are connected to one another by a spring-like piece such as a flexure bearing or a coil spring. One of these two elements (wire coil or permanent magnet) is firmly affixed to tool 102, while the other is allowed to move freely, within the limits permitted by the spring. Driving a current through the wire coil causes equal and opposite forces between the coil and the magnet, which causes movement of either the wire coil, the magnet, or the wire coil and the magnet. The moving component of the voice coil actuator may desirably be mounted on low friction linear bearings. Suitable voice coil actuators for use as actuator 118 include, for example, voice coil linear actuators provided by H2W Technologies, Inc. or BEI Kimco Magnetics. Other suitable actuators will be known to one of ordinary skill in the art from the description herein.

Tool 102 also includes at least one force sensor 120. Force sensor 120 may be integrally built into tool 102, or may be attached to tool 102. Force sensor 120 is coupled to tool 102 in a location where it can measure a contact force experienced by tool 102. Force sensor 120 may measure force on tool 102 in any direction, e.g., normal force from the surface, torque on the tool 102, or other forces. In an exemplary embodiment, force sensor 120 is coupled to tool 102 in order to sense the force felt by the tool's tip 114 when it contacts the surface to be captured. While one force sensor 120 is illustrated, it will be understood that tool 102 may include any number of force sensors 120. Suitable force sensors for use as force sensor 120 will be known to one of ordinary skill in the art from the description herein.

Tool 102 also includes at least one speed sensor 122. Speed sensor 122 may be integrally built into tool 102, or may be attached to tool 102. Speed sensor 122 is coupled to tool 102 in a location where it can measure the speed of motion of tool 102. In an exemplary embodiment, speed sensor 122 is coupled to tool 102 in order to sense the speed of tool tip 114 as it is moved along the surface to be captured. Speed sensor 122 may also preferably measure the direction of movement of tool 102. While this discussion refers to a sensor that directly measures speed, it will be understood that speed sensor 122 may also be another basic type of sensor, such as a position and/or an acceleration sensor, combined with appropriate signal processing to produce a speed measurement. While one speed sensor 122 is illustrated, it will be understood that tool 102 may include any number of speed sensors 122. Suitable speed sensors for use as speed sensor 122 will be known to one of ordinary skill in the art from the description herein.

Figure 1B:
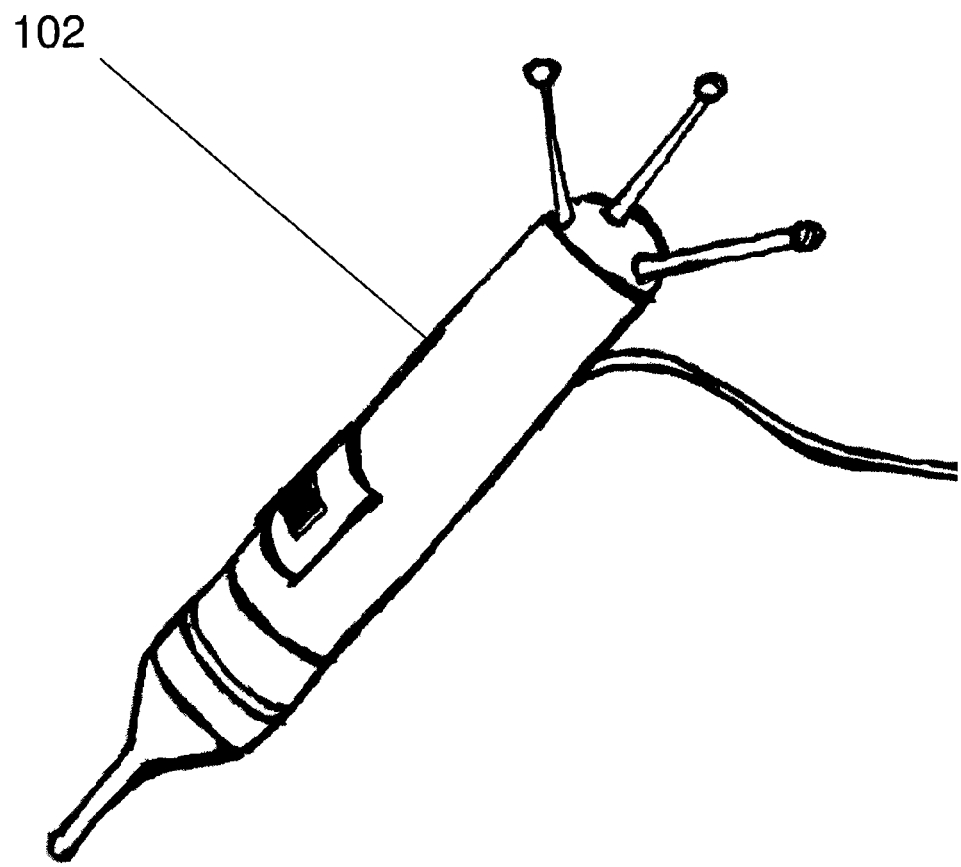
FIG. 1B is a diagram of an exemplary tool for use with the system of FIG. 1A.
Figure 1C:
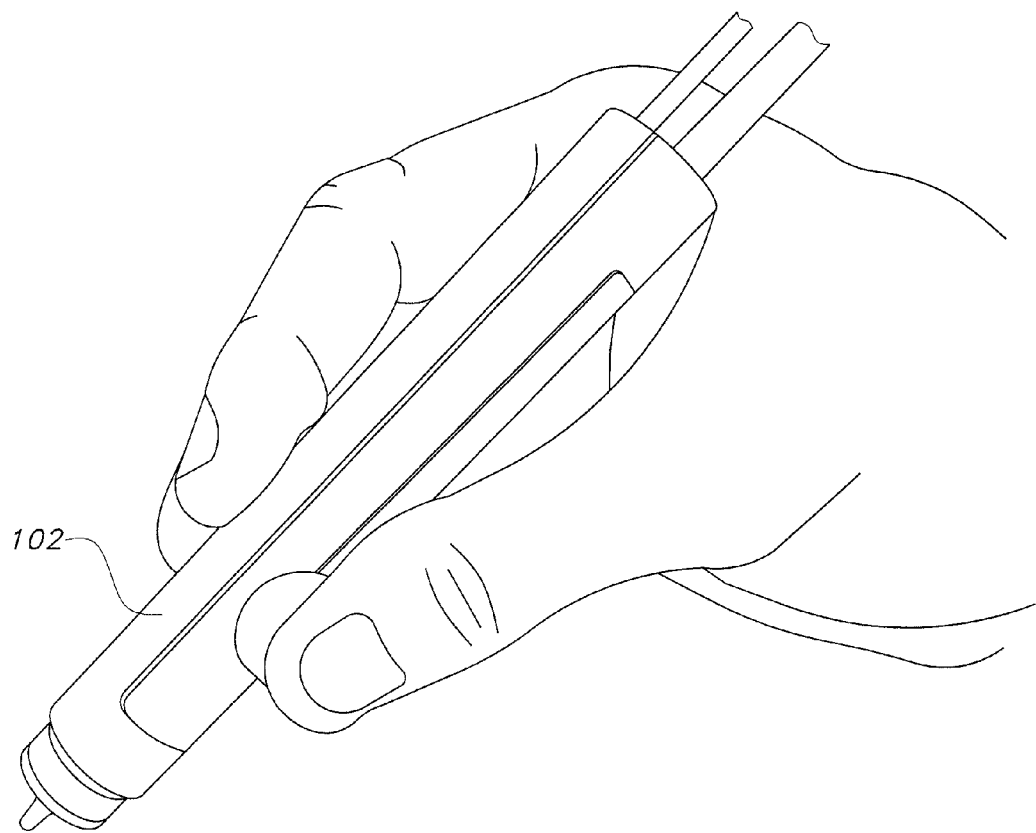
FIG. 1C is an image of another exemplary tool for us with the system of FIG. 1A.

The above sensors are illustrative of the data that can be recorded regarding tool 102, and are not meant to be limiting. For example, the position and orientation of tool 102 may also be measured. Tool 102 may preferably include one or more motion tracking sensors, such as infrared, optical, or magnetic locators (as shown in FIG. 1B), to determine the position and orientation of tool 102. Suitable locators for use with tool 102 will be known to one of ordinary skill in the art. For another example, tool 102 may include a grip force sensor coupled to the handle portion 112 of tool 102, to measure the force of the user's grip on tool 102.

As described above, it may be desirable to measure acceleration frequencies within a predetermined frequency band, e.g., from 20 Hz to approximately 1000 Hz. Accordingly, it will be desirable that the sensors used with tool 102 have sampling rates that are relatively high with respect to the bandwidth of accelerometer 116. Additionally, it may be desirable that the sampling rates of all sensors of tool 102 be the same, to facilitate synchronizing data from tool 102 for a respective touching event.

Storage device 104 is in communication with tool 102. Data from the sensors on tool 102 may be transmitted to the storage system 104 in a variety of ways, Storage device 104 may receive analog or digital signals from tool 102 by wired electrical connections. Alternatively, storage device 104 may receive analog or digital signals from tool 102 wirelessly via a wireless communication protocol. A wireless connection between storage device 104 and tool 102 may be desirable to allow free movement of tool 102 by the user. Suitable signal transmission methods will be know to one of ordinary skill in the art from the description herein.

Storage device 104 stores the signals measured by tool 102 over time. Specifically, storage device 104 stores the acceleration measured by accelerometer 116, the force measured by force sensor 120, and the speed measured by speed sensor 122. In an exemplary embodiment, storage device 104 is a computer readable storage medium, such as a computer memory. Suitable memory for use as storage device 104 will be known to one of ordinary skill in the art from the description herein.

Processor 106 is in communication with storage device 104. Processor 106 processes the data from tool 102 that is stored in storage device 104. For example, when tool 102 is used for capturing the feel of a surface, processor 106 is programmed to analyze the acceleration, force, and speed measured by tool 102 to generate a texture model of the surface. The texture model may correspond to the feel of the surface at a specific average force and/or at a specific average speed. In an exemplary embodiment, processor 106 generates a texture model for the surface by linear predictive coding. Additional details regarding the generation of a texture model will be provided herein.

For another example, when tool 102 is used for recreating the feel of a surface, processor 106 is programmed to determine an estimated contact force and an estimated contact speed based on the acceleration, force, and/or speed measured by tool 102. Processor 106 is further programmed to create or select at least one vibration waveform from a texture model of the surface based on the estimated contact force and estimated contact speed. Processor 106 then actuates the actuator 118 of tool 102 based on the selected vibration waveform. Additional details regarding the actuation of actuator 118 will be provided herein.

Figure 3:
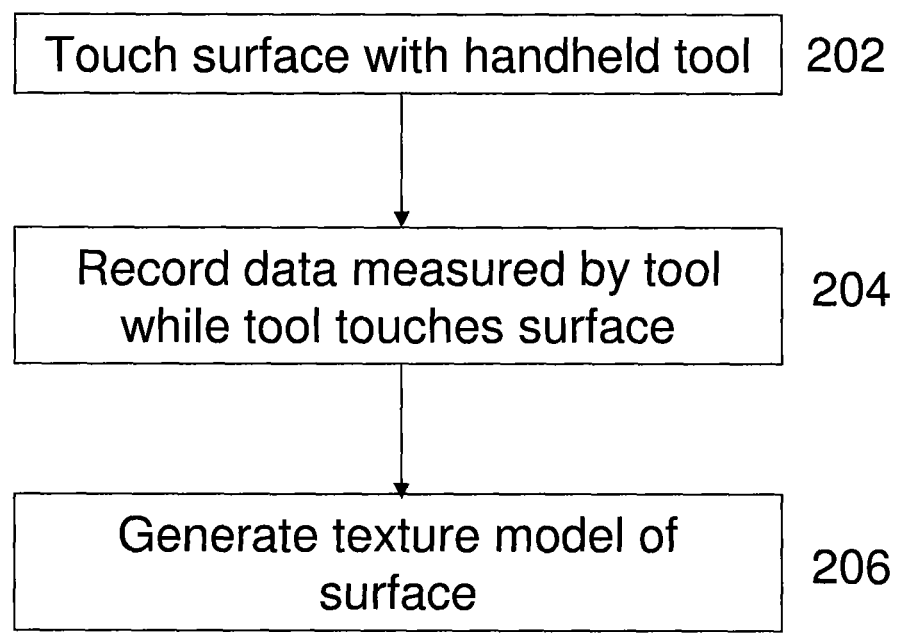
FIG. 3 is a flowchart depicting an exemplary method for capturing and recreating the feel of the surface of an object in accordance with an aspect of the present invention.

FIG. 3 is a flowchart illustrating an exemplary method 200 for capturing the feel of a surface in accordance with an aspect of the present invention. As an overview, method 200 includes touching a surface with a handheld tool, recording data from the tool while the tool touches the surface, and generating a texture model for the surface based on the recorded data. For the purposes of illustration, the steps of method 200 are described herein with respect to the components of system 100. Additional details of method 200 are described below.

Figure 2A:
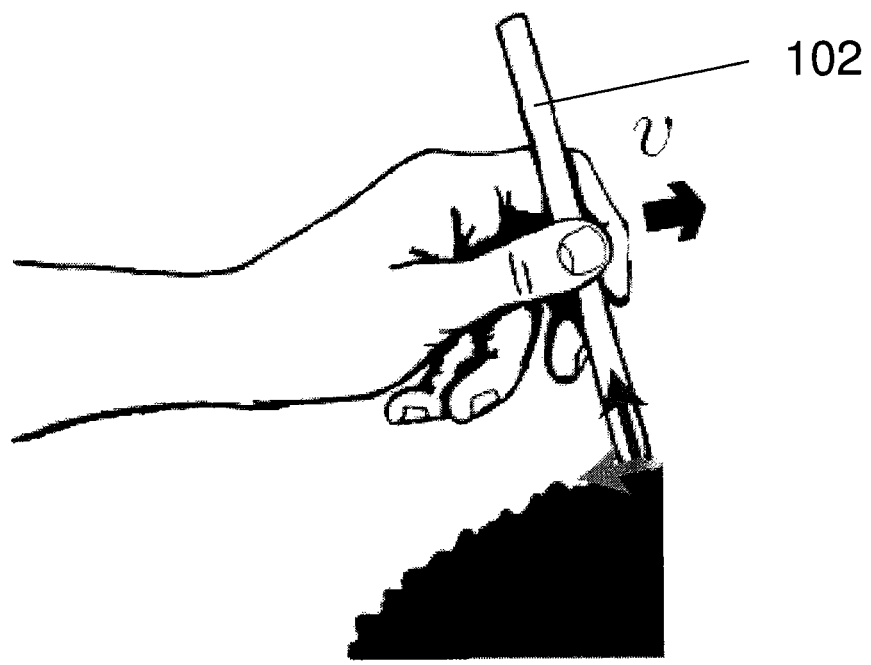
FIG. 2A is a diagram depicting capturing the feel of a surface using the system of FIG. 1A.

In step 202, the surface to be captured is touched with a handheld tool. A user may select a surface to be captured for creating a haptograph. Once the surface is selected, the user touches the surface with the handheld tool. In an exemplary embodiment, a user touches the surface with tool 102, as shown in FIG. 2A. The user may hold tool 102 at the handle portion 112 and touch the surface with the tip portion 114. The user may desirably touch the surface with tool 102 in a stroking motion, i.e., by moving tool 102 while tool 102 is in contact with the surface. It may further be preferable that the user maintain a relatively steady contact force and speed during contact with the surface. Alternatively, the user may touch the surface with tool 102 in a tapping motion. It may be preferable that the tool 102 not damage the selected surface during a touching event.

In order to enable recreation of a full feel of the surface, it may be desirable that the user touch the surface with tool 102 a plurality of times. In a preferred embodiment, a user taps and/or strokes the surface a plurality of times with tool 102. The user may alter the force with which the tool 102 touches the surface during the plurality of times, and/or may alter the speed at which the tool 102 moves across the surface during the plurality of times. For example, it may be preferable to capture a plurality of touching events covering a range of force and speed combinations at regular intervals. This may be desirable in order to create a plurality of data sets showing the acceleration experienced by tool 102 for differing forces and speeds of contact with the surface.

During the touching of the surface with tool 102, it may be desirable to provide the user with feedback to assist in capturing data about the surface. For example, system 100 may provide graphical feedback to a user via one or more displays. System 100 may further provide auditory feedback to a user via one or more speakers. System 100 may further provide haptic feedback, substantially as described herein.

While tool 102 is described as being manipulated directly by a human user, it is contemplated that tool 102 may be manipulated in other ways. For example, step 202 may be performed by an automatic or semiautomatic mechanism configured to touch a surface with tool 102. Alternatively, step 202 may be performed by a non-human primate or by a robot that is controlled remotely by a human or a non-human primate.

In step 204, the data measured by the tool sensors is recorded while the tool touches the surface. In an exemplary embodiment, storage device 104 stores the data measured by accelerometer 116, force sensor 118, and speed sensor 120 of tool 102. Thereby, for each touching event (i.e., when the tool 102 is in contact with the surface), storage device 104 stores the acceleration experienced by the tool 102, the force experienced by the tool 102, and the speed of the tool 102. Storage device 104 desirably stores the data from each of these sensors over the same span of time, such that the signals are synchronized with one another. When tool 102 touches the surface a plurality of times, storage device 104 may store data measured by tool 102 for each touching event separately.

As described above, accelerometer 116 may have multiple measurement axes for measuring the acceleration of tool 102 in multiple dimensions. Accordingly, storage device 104 may store the acceleration data for each axis of accelerometer 116. Alternatively, the acceleration data for the multiple dimensions may be reduced to a single dimension. This may be done in a number of different ways.

One option for reducing multiple-axis acceleration data to a single value is to simply record only one axis of acceleration recorded by accelerometer 116. Another option for reducing multiple-axis acceleration data to a single dimension is to sum the multiple axes into a single value. Still another option is by projecting the multi-dimensional acceleration data onto a single dimension, and relying on the principle component of the acceleration.

In one exemplary embodiment, processor 106 reduces multiple dimensions of acceleration data into a single dimension using a discrete Fourier transform (DFT) analysis. By expressing each component of the multi-dimensional, e.g., 3D signal as an orthogonal basis function expansion, the components can be summed without destructive interference.

Human perception of high-frequency vibrations relies at least in part on the spectral content of the signal. Thus, it may be desirable that a dimensionally reduced vibration feel like it has the same spectrum as the original recorded signal. In other words, a synthesized 1D vibration should have the same energy at each frequency as the sum of the energies present at that frequency in the original vibration's three component directions. Consequently, the transformation should preserve the total Energy Spectral Density (ESD) of the original 3D signal, where the ESD of each component a(t) is $E_s(f)=|A(f)|^2$, where A(f) is the Fourier transform of a(t).

Because raw spectral estimates are noisy, spectral similarity need not be judged directly from the energy spectral density at each frequency. Instead, a spectral metric has been designed that takes into account the limited frequency resolution of human vibration perception. Hence, the spectral perceptual comparisons may use a frequency smoothing resolution. The smoothed version of A(f) may be denoted as $\tilde{A}(f)$. Using $a_s(t)$ to represent the 1D synthesized signal that results from the transformation and As(f) to represent its discrete Fourier transform, the spectral matching metric may be written as:

$$M_{sm} = 1 - \frac{1}{n_f} \sum_{f=20Hz}^{1000Hz} \left( \frac{\left| |\tilde{A}_x(f)|^2 + |\tilde{A}_y(f)|^2 + |\tilde{A}_z(f)|^2 - |\tilde{A}_s(f)|^2 \right|}{|\tilde{A}_x(f)|^2 + |\tilde{A}_y(f)|^2 + |\tilde{A}_z(f)|^2} \right)$$

(Equation 1) where $n_f$ signifies the number of discrete frequencies in the sum. Here, the extent to which the synthesized signal preserves the energy in the original 3D signal is quantified for frequencies from 20 Hz to 1000 Hz, chosen to match the sensitivity to vibration of human hands. This frequency range could be changed to suit user preference. Over the included frequency range, this calculation provides a strict measure of the average normalized deviation between the 1D signal's smoothed ESD and the 3D signal's smoothed ESD. If the two are identical, the spectral match metric will be one.

In view of the spectral requirements on the synthesized signal, the DFT represents one feasible choice of such basis functions. Following (Equation 1):

$$|\tilde{A}_s(f)|^2 = \sqrt{|\tilde{A}_x(f)|^2 + |\tilde{A}_y(f)|^2 + |\tilde{A}_z(f)|^2}$$ (Equation 2).

Having obtained the absolute value of $\tilde{A}_s(f)$ and by that set the local spectrum of $a_s$, a phase $\theta_f$ must be assigned that ensures desirable temporal properties. To this end, the phase is optimized to neglect the absolute values for simplicity. In the frequency domain, the sum of cross-correlations at zero time shift can be expressed as:

$$\sum_{i=1}^{3} a_i * a_s$$

It can be shown that this quantity is maximized when the phase of $\tilde{A}_s$ is chosen as follows:

$$\theta_f^{max} = \angle \sum_{i=1}^{3} \tilde{A}_i$$

(Equation 3)

The synthesized time-domain signal $a_s$ is then obtained by a square-root, multiplication by $e^{j\theta}$ where $j=\sqrt{-1}$, and inverse DFT. By Parseval's theorem the result will always have the same signal energy as the sum of energies of the components. This new dimensional reduction approach may be particularly suitable for reducing multi-dimensional acceleration data to a single acceleration value.

As described above, accelerometer 116 may desirably measure only vibrations occurring within a predetermined frequency range. Accordingly, storage device 104 may only store acceleration data having a frequency within a predetermined frequency range, e.g., from approximately 20 Hz to approximately 1000 Hz. As set forth above, storage device 104 may optionally be reconfigurable so that a user can change the bandwidth of the recorded vibrations measured to suit the user's preference.

In step 206, a texture model of the surface is generated. In an exemplary embodiment, processor 106 generates a texture model for the surface based on the data recorded by storage device 104. From the stored data from force sensor 120 and speed sensor 122, processor 106 determines an average force experienced by tool 102 and an average speed of tool 102. Processor 106 may determine the average force and average speed for a subset of a touching event, an entire touching event, or for a group of touching events.

The feel of the surface is captured electronically by generating a mathematical model of the surface's texture. This texture model may then be used at a later time to recreate the accelerations or vibrations that are felt when contacting the surface. However, it may be difficult or impractical to record the accelerations or vibrations felt on the surface for all possible combinations of force and speed. Thus, a texture model must be created that enable the prediction of the acceleration/vibratory response of the surface at substantially all possible combinations of force and speed.

Figure 4:
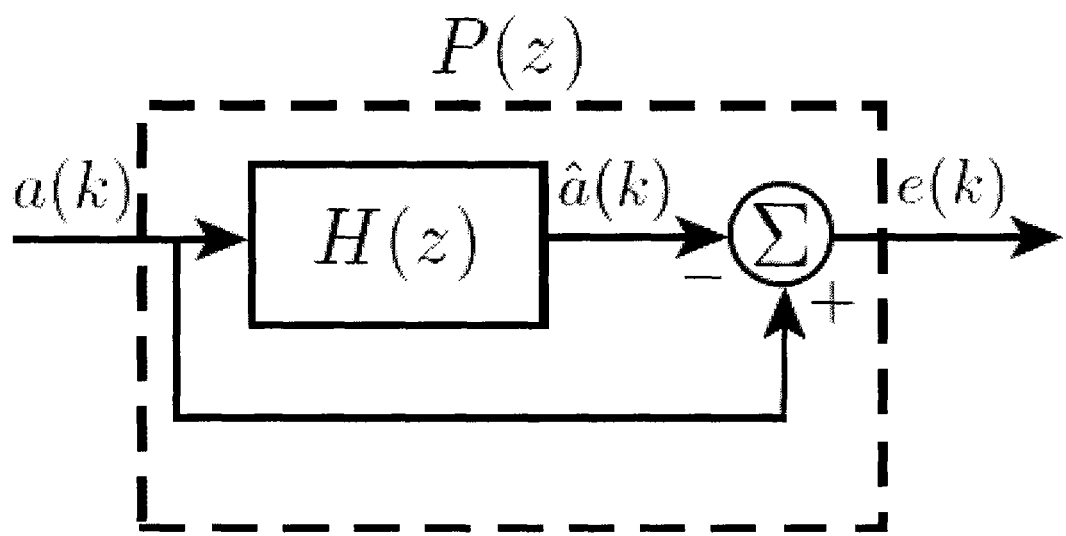
FIG. 4 is a block diagram illustrating a process for generating a texture model in accordance with aspects of the present invention.

To solve this problem, in one exemplary embodiment, a texture model is created by linear predictive coding. For linear predictive coding, the response of the tool/surface interaction is treated as a filter to be identified. FIG. 4 illustrates a block diagram for use in explaining linear predictive coding. An input signal a(k) represents the original time series of accelerations measured by accelerometer 116. The filter's output vector is defined as â(k), which represents a forward linear prediction. H(z) is assumed to be an IIR (infinite impulse response) filter of length n of the form H(z)= $[-h_1 z^{-1} - h_2 z^{-2} \ldots -h_n z^{-n}]$. The residual of these two signals is the error vector e(k), and the transfer function P(z) is:

$$\frac{E(z)}{A(z)} = 1 - H(z) = P(z)$$

(Equation 4).

The vector of filter coefficients may be defined as $h=[h_1, h_2, h_3 \ldots h_n]^T$, and the n-length time history of the input signal as $a(k-1)=[a(k-1)\ a(k-2) \ldots a(k-n)]$. The residual at each step in time can then be written with the following difference equation:

$$e(k) = a(k) - \tilde{a}(k) = a(k) - h^T a(k-1)$$ (Equation 5).

Optimal filter values of h can be found by defining a suitable cost function. The standard choice of mean-square error can be used, $J(h)=E\{e^2(k)\}$, where $E\{\ \}$ denotes mathematical expectation. When the gradient of J(h) is flat, H is at an optimal value, $h_0$. By algebraic manipulation, the following result for the gradient can be derived:

$$\frac{\partial J(h)}{\partial h} = -2E\{(e(k)a(k-1))\}$$

(Equation 6). When the gradient is flat at $h_0$, the error is at a minimum $e_0(k)$, and the problem can be simplified to:

$$E\{e_0(k)a(k-1)\} = 0_{n \times 1}$$ (Equation 7).

By substituting values for the cross-correlation matrix $(R=a(k-1)a^T(k-1))$ and the cross-correlation vector $(p=a(k-1)a(k))$ into (Equation 7), one arrives at the Wiener-Hopf equation:

$$R \cdot h_0 = p$$ (Equation 8).

Figure 5:
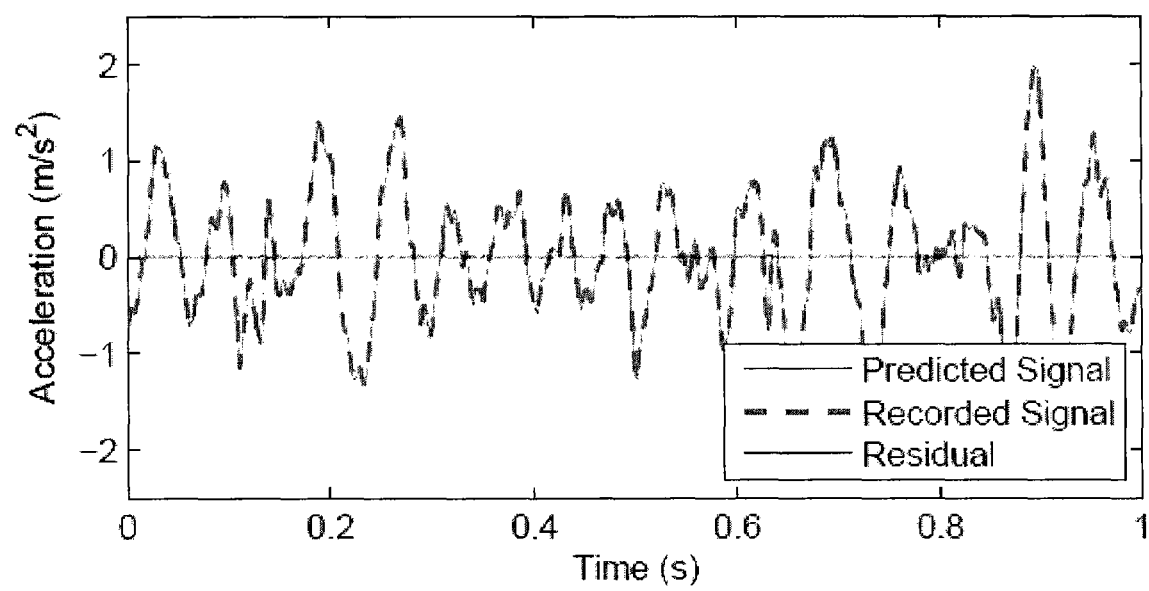
FIG. 5 is a sample plot of a recorded signal, a predicted signal, and a residual signal for an exemplary texture model derived using the process of FIG. 4.

Assuming a non-singular R, the optimal forward predictor coefficients can be found by simply inverting the cross-correlation matrix, such as $h_0 = R^{-1} p$. Alternatively, a recursive method can be used, such as the Levinson-Durbin algorithm, to solve for $h_0$ from (Equation 8). FIG. 5 shows a sample plot of a(k) (Recorded Signal), â(k) (Predicted Signal), and e(k) (Residual) for an optimal filter H(z) of order n=120. By solving for H(z), processor 106 can generate a texture model for use in recreating the feel of the selected surface based on the measured n acceleration values experienced by tool 102 in capturing the feel of the surface. The texture model consists of the variance of the residual signal and the vector of chosen filter coefficients.

Figure 6:
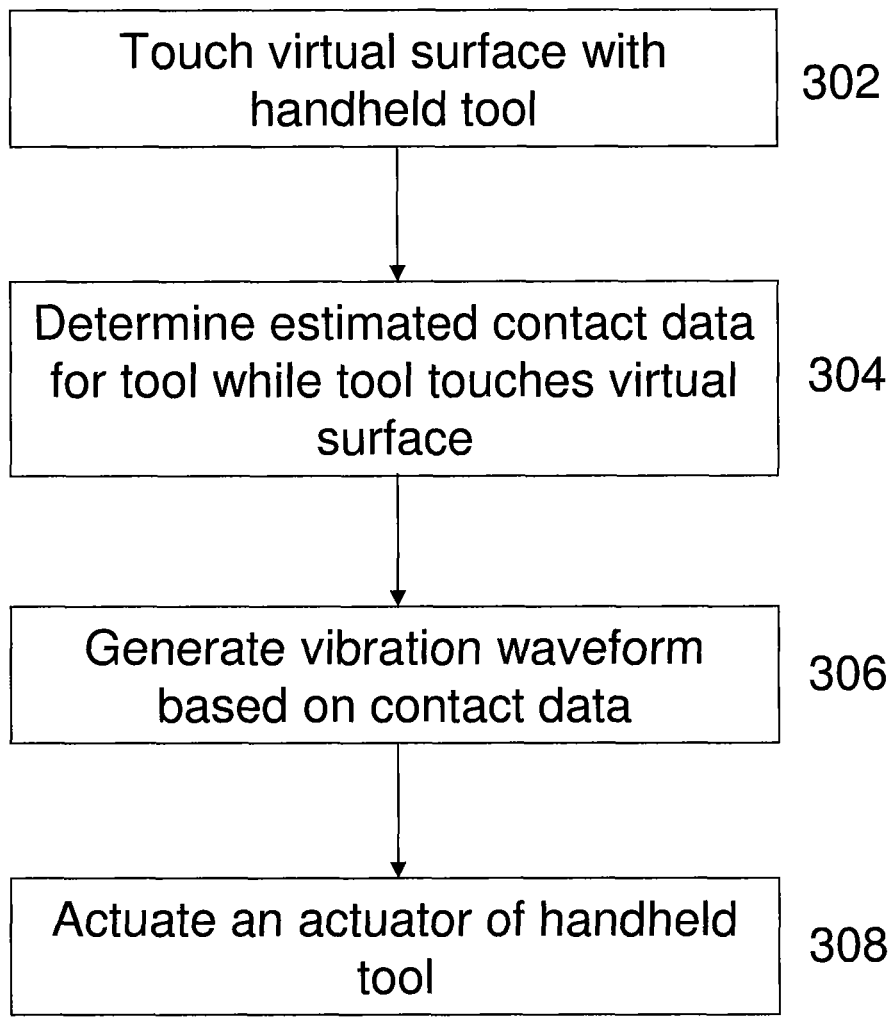
FIG. 6 is a flowchart depicting an exemplary method for recreating the feel of a surface in accordance with an aspect of the present invention.

FIG. 6 is a flowchart illustrating an exemplary method 300 for recreating the feel of a surface in accordance with an aspect of the present invention. It will be understood that method 300 can be performed at a later time, in combination with, or immediately following the capture of the feel of a surface, as set forth above in method 200. As an overview, method 300 includes touching a virtual surface with a handheld tool, determining estimated contact data, generating a vibration waveform, and actuating an actuator of the tool. For the purposes of illustration, the steps of method 300 are described herein with respect to the components of system 100. Additional details of method 300 are described below.

Figure 1D:
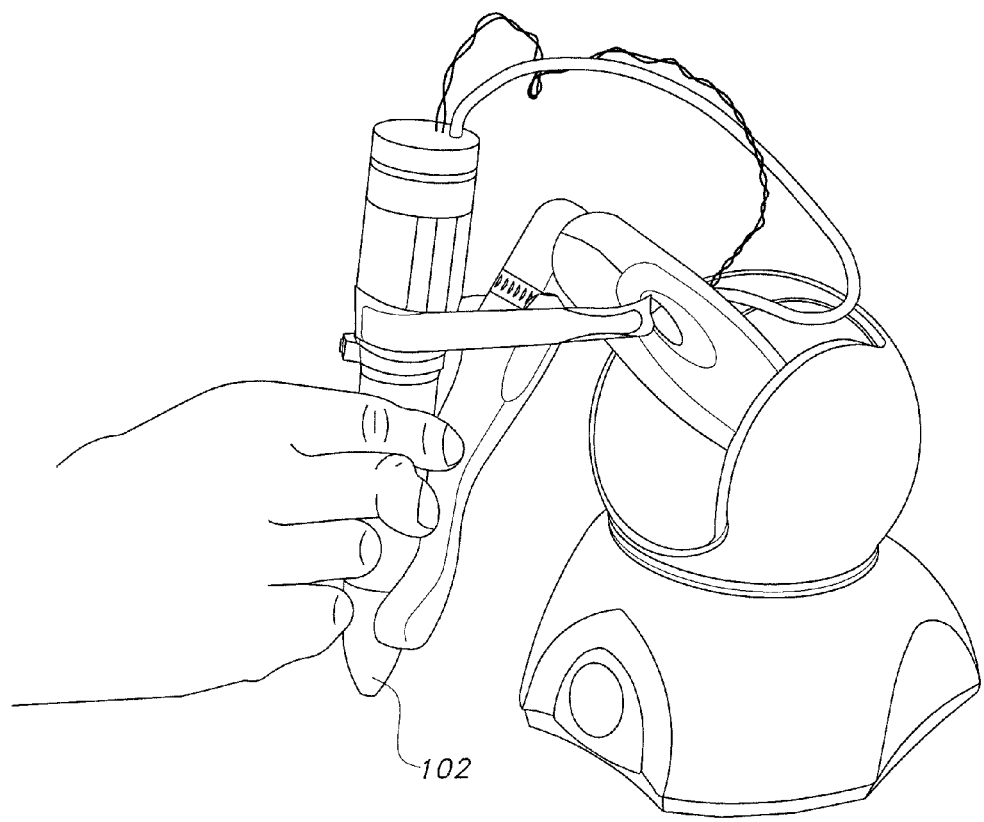
FIG. 1D is an image of still another exemplary tool for use with the system of FIG. 1A.
Figure 2B:
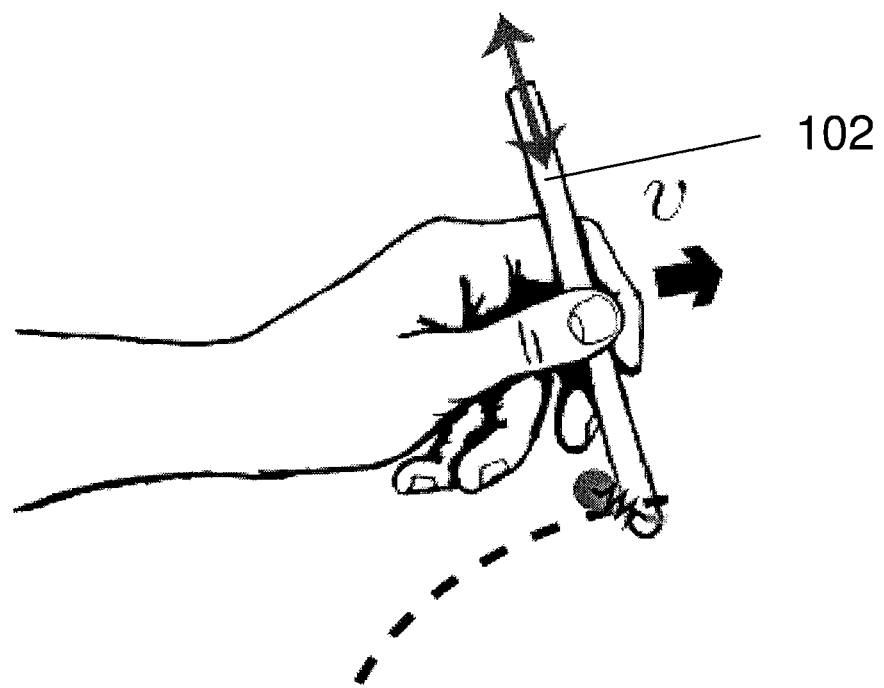
FIG. 2B is a diagram depicting recreating the feel of a surface using the system of FIG. 1A.

In step 302, a virtual surface is touched with a handheld tool. A user may select a real surface to be recreated from a list of available haptographs, or this choice may be pre-selected by the computer processor. Once the surface is selected, the user touches the virtual surface with the handheld tool. The virtual surface may be of any type that can recreate the feel of the selected surface. For example, the virtual surface may be overlaid on a real surface, such that the texture of the selected surface will be rendered on top of the texture of the real surface. In this example, the real surface may be the screen of a tablet computer or the surface of a typical object such as a foam block. Preferably, the surface of this real object is smooth. For another example, the virtual surface may exist in an area of space lacking a real surface, as shown in FIG. 2B. In this example, the presence of the virtual surface may be indicated to the user through visual cues (e.g., on a computer monitor), through auditory cues (e.g., via speakers), and/or through haptic cues (e.g., via actuators attached to tool 102). In particular, this type of virtual surface may be created with an impedance-type haptic interface with one or more translational or rotational degrees of freedom. A suitable impedance-type haptic interface is shown in FIG. 1D. The motors of such a device can be used to exert synthetic contact forces on tool 102, to give the user the impression that he or she is touching a real surface at the given location. It is common for such virtual surfaces to be programmed to respond as linear springs, such that the force delivered to the user is proportional to and in the opposite direction as the tool tip's penetration into the virtual surface.

Figure 7:
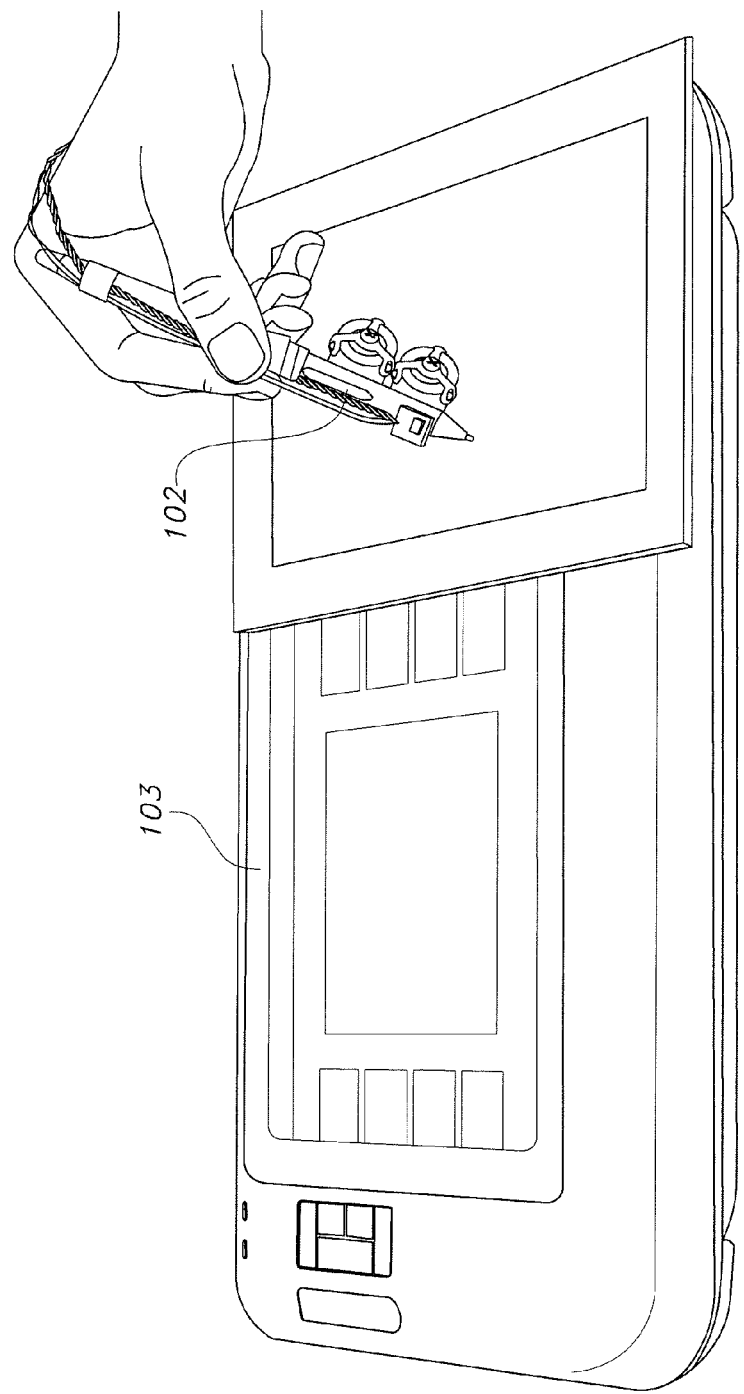
FIG. 7 is an image of an exemplary tool and tablet computer screen for use in recreating the feel of a surface in accordance with an aspect of the present invention.

In a particular embodiment, tool 102 may be shaped as a stylus, and the virtual surface may be a tablet computer screen 103, as shown in FIG. 7. For purposes of illustration, a WACOM™ tablet computer screen is shown, such as those that can be used with pressure- and tilt-sensitive pens for editing digital images, applying effects and filters, sketching, painting and modeling. The right part of the WACOM tablet computer screen has been covered with a real textured surface to enable method 200 (capturing the feel of a real surface), and the left part of the WACOM tablet computer screen has been left bare to form tablet computer screen 103. The real textured surface may also be augmented to feel like other surfaces via application of method 300.

Tool 102 may be tapped or stroked across the surface of the tablet computer screen 103 to recreate the feel of the selected surface. In this embodiment, the tablet computer screen 103 may be used to detect the contact force and speed of tool 102 in addition to or in place of force sensor 120 and speed sensor 122.

In an exemplary embodiment, a user touches the virtual surface with tool 102, as described above with respect to method 200. The user may hold tool 102 at the handle portion 112 and touch the surface with the tip portion 114. The user may desirably touch the virtual surface with tool 102 in a stroking motion, i.e., by moving tool 102 while tool 102 is in contact with the surface. Alternatively, the user may touch the virtual surface with tool 102 in a tapping motion.

In step 304, estimated contact data for the tool are determined. In an exemplary embodiment, processor 106 calculates an estimated contact force of tool 102 based on the measurements of force sensor 120, and calculates an estimated speed of tool 102 based on the measurements of speed sensor 122. When no actual surface is present, as in the second virtual surface example, processor 106 may also estimate the contact force of tool 102 based on the amount by which the user has penetrated the virtual surface with the tool tip. In the same situation, processor 106 may calculate the estimated speed of tool 102 by computing the speed at which the user is moving tool 102 across (parallel to) the virtual surface.

In step 306, a vibration waveform is generated. In an exemplary embodiment, processor 106 generates at least one vibration waveform based on the texture model for the surface to be recreated. As described above with respect to method 200, processor 106 is programmed to create a texture model for the surface during capture of the feel of the surface. The texture models may be created, for example, by forward linear predictive coding, where the filter H(z) is the texture model for the surface.

Figure 8:
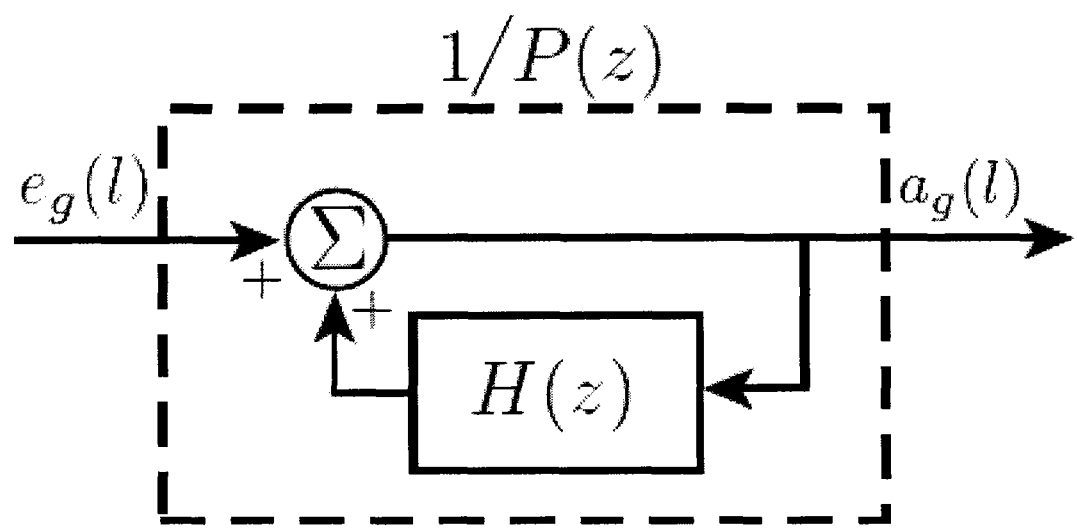
FIG. 8 is a block diagram illustrating a process for generating a vibration waveform in accordance with aspects of the present invention.

As the user touches the virtual surface with tool 102, processor 106 generates the vibration waveform from the texture model using the estimated contact force and the estimated contact speed. FIG. 8 illustrates a block diagram for use in explaining the generation of a vibration waveform. An input signal $e_g(l)$ is a white noise vector of a specific variance that may be generated in real time. This input signal is generated based on the estimated contact force and speed determined in step 304. The output signal is $a_g(l)$, a synthesized acceleration signal corresponding to the vibration waveform to be used to drive actuators 118. Output signal $a_g(l)$ is a signal with spectral properties that are very close to those of the acceleration signal a(k) measured by accelerometer 116 at the given contact force and contact speed. A higher order filter H(z) (or texture model) will generally result in a better spectral match between the output acceleration signal $a_g(l)$ and the original signal a(k). By rewriting (Equation 4), a new transfer function can be formulated:

$$\frac{A_g(z)}{E_g(z)} = \frac{1}{1 - H(z)} = \frac{1}{P(z)}$$

(Equation 9).

The difference equation for the synthesized acceleration is:

$$a_g(l) = e_g(l) + h^T a_g(l-1) \quad \text{(Equation 10)}.$$

Figure 9:
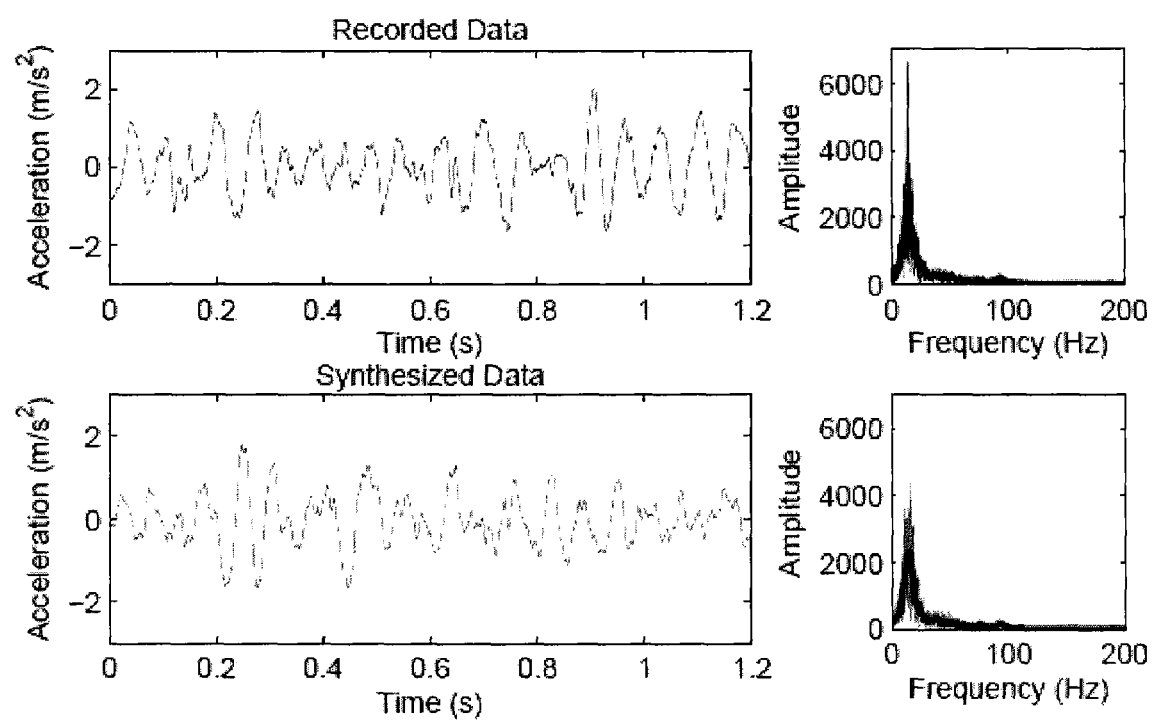
FIG. 9 is a sample plot of a recorded acceleration (top) and an exemplary vibration waveform (bottom) derived using the process of FIG. 8.

It will be understood that the signal power of the input signal is important for generating a vibration waveform having an appropriate magnitude (corresponding to the acceleration experienced during the capture of the feel of the surface). For linear predictive coding, the white noise input signal should have a variance equal to the variance of the residual signal from the texture modeling step. FIG. 9 shows an exemplary recorded acceleration (top) and an exemplary vibration waveform (bottom) derived using the above-described algorithm.

The vibration waveform generated by processor 106 substantially corresponds to the accelerations measured by accelerometer 116 for the corresponding texture model. Processor 106 may generate multiple vibration waveforms that differ in frequency, amplitude, or phase, for example, to accurately reproduce the measured accelerations. Preferably, processor 106 estimates the tool's contact force and contact speed at a high temporal rate and adjusts the texture model to match these changing contact variables. When the user is allowed to explore the virtual surface freely, there will commonly be no texture model available for the specific contact variables currently being measured. In this case, the processor may interpolate between models captured under conditions similar to the current conditions, using a method such as bilinear interpolation. In the case of linear predictive coding, both the variance of the residual and the frequency response of the model need to be interpolated.

In step 308, an actuator of the tool is actuated. In an exemplary embodiment, processor 106 actuates at least one actuator 118 of tool 102 based on the vibration waveform generated. Processor 106 actuates actuator 118 to provide vibrations to tool 102 that correspond to the accelerations measured by accelerometer 116 when the selected surface was captured.

The vibrations desirably correspond in both amplitude and frequency to the originally measured accelerations. As described above, accelerometer 116 may only measure and record vibrations inside a predetermined frequency range, e.g., from approximately 20 Hz to approximately 1000 Hz. Accordingly, actuator 118 may desirably only provide vibrations occurring within the predetermined frequency range.

The vibration may be monitored across all frequencies provided by actuator 118. If the amplitude of vibrations provided by actuator 118 is not constant across all frequencies, processor 106 may be programmed compensate for any deviations. This may enable actuator 118 to provide more realistic vibrations to the user.

Aspects of the invention illustrated in the above described systems and methods achieve the following advantages not found in the prior art.

The above-described systems and methods provide a novel way to generate synthetic texture signals via automated analysis of real recorded data. These systems and methods are capable of modulating the synthetic signal based on changes in two critical probe-surface interaction parameters, translational velocity and normal force, by using bilinear interpolation. These synthetic signals are both simple and fast to compute, as well as strongly matched to their real counterparts in the time- and frequency-domains.

The above-described systems and methods establish an approach of haptography that can enable novel avenues of human-computer interaction and make significant contributions to the progress of ongoing research in several fields. For example, the above-described systems and methods may be usable for keeping haptic records, touching virtual versions of valuable items, touching remote objects in real time, and understanding human and robot touch capabilities.

Additionally, by employing a human haptographer holding the handheld tool, quick and safe explorations can be performed for the surfaces of almost any physical object. A human will naturally gravitate toward object areas that are most interesting to touch, effortlessly moving the tool in ways that match the motions that will be employed by eventual users of the associated rendering of the virtual surface. These stereotypical hand movements are known as exploratory procedures, and they are widely observed when an individual seeks to ascertain a specific object property of a surface. For example, lateral motion yields good haptic information about texture, and pressure elucidates compliance.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for capturing a feel of a surface, the method comprising the steps of:
   contacting the surface with a handheld tool, the handheld tool including at least one accelerometer configured to measure an acceleration experienced by the tool, at least one force sensor configured to measure a force experienced by the tool, and at least one speed sensor configured to measure a speed of the tool;
   recording the acceleration experienced by the tool, the force experienced by the tool, and the speed of the tool while the tool contacts the surface; and
   generating a texture model of the surface by using the recorded acceleration to calculate a filter by linear predictive coding, the filter applicable to a predetermined input signal in order to output the vibration corresponding to the feel of the surface at the recorded force and speed, the filter configured to create a first vibration corresponding to the feel of the surface at a first combination of force and speed, and configured to create a second vibration corresponding to the feel of the surface at a second combination of force and speed.

2. The method of claim 1, wherein the recording step comprises:
   recording the acceleration experienced by the tool when the acceleration has a frequency in a range from approximately 20 Hz to approximately 1000 Hz.

3. The method of claim 1, wherein the contacting step comprises:
   touching the surface with the tool in a stroking motion.

4. The method of claim 3, further comprising the steps of:
   contacting the surface with the tool a plurality of times, the plurality of times having different combinations of force experienced by the tool and speed of the tool.

5. The method of claim 1, further comprising the step of:
   determining an average force experienced by the tool and an average speed of the tool for a respective touch of the surface with the tool.

6. A method for recreating a feel of a surface, the method comprising the steps of:
   storing a texture model of a surface, the texture model generated using acceleration recorded during contact with the surface to calculate a filter by linear predictive coding, the filter applicable to a predetermined input signal in order to output the vibration corresponding to the feel of the surface at the recorded force and speed, the filter configured to create a first vibration corresponding to the feel of the surface at a first combination of force and speed, and configured to create a second vibration corresponding to the feel of the surface at a second combination of force and speed;
   enabling contact with a virtual surface with a handheld tool, the handheld tool including at least one actuator configured to provide an acceleration to the tool, at least one force sensor configured to measure a force experienced by the tool, and at least one speed sensor configured to measure a speed of the tool;
   determining an estimated contact force based on the measured force experienced by the tool and an estimated contact speed based on the measured speed of the tool;
   using the texture model to generate a vibration waveform at the estimated contact force and the estimated contact speed of the tool; and actuating the at least one actuator of the tool according to the vibration waveform.

7. The method of claim 6, wherein the actuating step comprises:
actuating the at least one actuator of the tool according to vibration waveform such that the actuator provides an acceleration to the tool having a frequency in a range from approximately 20 Hz to approximately 1000 Hz.

8. A system for capturing and recreating a feel of a surface comprising:
a handheld tool including at least one accelerometer configured to measure an acceleration experienced by the tool, at least one force sensor configured to measure a force experienced by the tool, and at least one speed sensor configured to measure a speed of the tool;
a storage device in communication with the tool, the storage device operable to store the acceleration experienced by the tool, the force experienced by the tool, and the speed of the tool over a period of time; and
a processor in communication with the storage device, the processor programmed to generate a texture model of the surface by using the stored acceleration to calculate a filter by linear predictive coding, the filter applicable to a predetermined input signal in order to output the vibration corresponding to the feel of the surface at the recorded force and speed, the filter configured to create a first vibration corresponding to the feel of the surface at a first combination of force and speed, and configured to create a second vibration corresponding to the feel of the surface at a second combination of force and speed.

9. The system of claim 8, further comprising:
another handheld tool including at least one actuator configured to provide an acceleration to the tool, at least one force sensor configured to measure a force experienced by the tool, and at least one speed sensor configured to measure a speed of the tool, wherein
the processor is programmed to determine an estimated contact force and an estimated contact speed based of the other tool based on the measured force experienced by the tool and the measured speed of the tool, generate at least one vibration waveform from the texture model based on the estimated contact force and the estimated contact speed, and actuate the at least one actuator of the other tool according to the selected at least one vibration waveform.

10. The system of claim 8, wherein the handheld tool further includes at least one actuator configured to provide an acceleration to the tool, wherein
the processor is programmed to determine an estimated contact force and an estimated contact speed based of the other tool based on the measured force experienced by the tool and the measured speed of the tool, generate at least one vibration waveform from the texture model of the surface based on the estimated contact force and the estimated contact speed, and actuate the at least one actuator of the other tool according to the selected at least one vibration waveform.

* * * * *